April 9, 1929.   W. D. COIL ET AL   1,708,357
SUPPORT FOR ENDLESS CONVEYERS
Filed Sept. 7, 1926

INVENTOR.
William D. Coil
BY William J. DeReamer
Staley & Bowman
ATTORNEYS.

Patented Apr. 9, 1929.

1,708,357

UNITED STATES PATENT OFFICE.

WILLIAM D. COIL, OF MUNCIE, AND WILLIAM J. DE REAMER, OF CROWN POINT, INDIANA.

SUPPORT FOR ENDLESS CONVEYERS.

Application filed September 7, 1926. Serial No. 133,817.

This invention relates to endless conveyers, it more particularly relating to means for guiding and supporting such conveyers.

One of the objects of our invention is to provide simple means for guiding and supporting endless conveyers, a more specific object being to provide supporting means in the form of rolls so connected with the chains of the conveyer as to protect the rolls and their bearings against undue wear.

Figure 3:
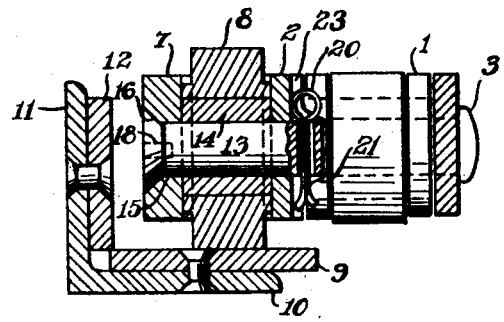
Fig. 3 is a section on the line 3—3 of Fig. 2.
Figure 4:
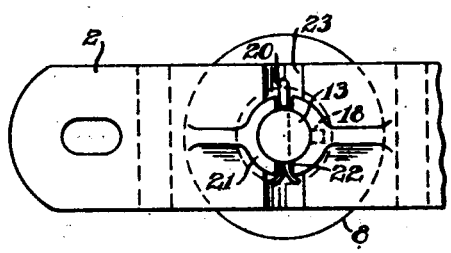
Fig. 4 is an elevation of the inner side of one of the roller carrying links.

Referring to the drawings, 1 and 2 represent the links of one of the chains of an endless conveyer, the links 1 being of the usual form, while the links 2 are of a special construction as hereinafter more fully described. The links are connected together in the usual way by pins 3; certain of the links, however, being connected by the ends of cross bars 4 which extend to the chain on the opposite side of the conveyer to connect the respective chains together and having thereon spacing sleeves 5. Journaled upon the pins 3 and the cross-bars 4 are anti-friction rolls 6 which serve to reduce the friction as the chains pass about the sprocket wheels of the turning drums (not shown).

The special links 2 are outside links and are provided with integrally formed U-shaped brackets 7, and these brackets and the links form housings open at the top and bottom. Within these housings are journaled supporting rolls 8 which run upon a metallic strip 9 secured to the horizontal web 10 of an angle-shaped supporting track. The vertical web 11 of this track also has secured thereto a metallic strip 12.

Figure 2:
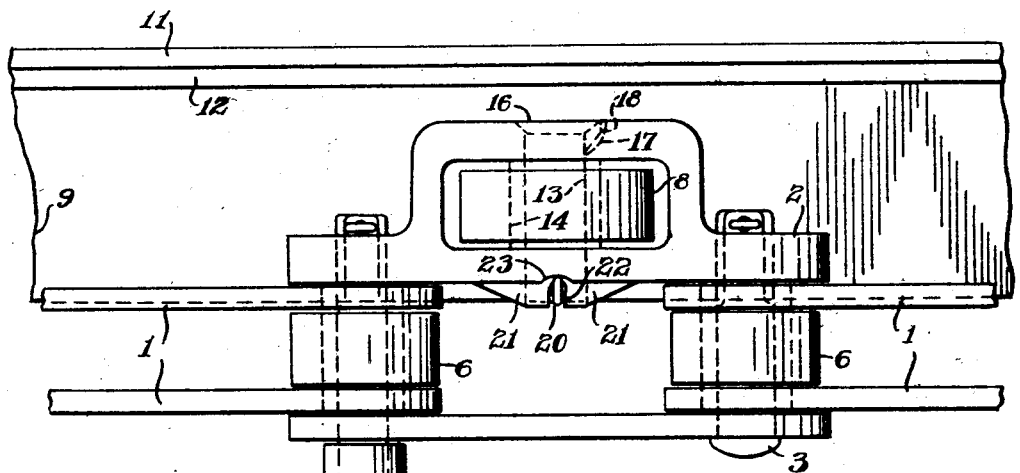
Fig. 2 is an enlarged plan view of a portion of the part shown in Fig. 1.
Figure 1:
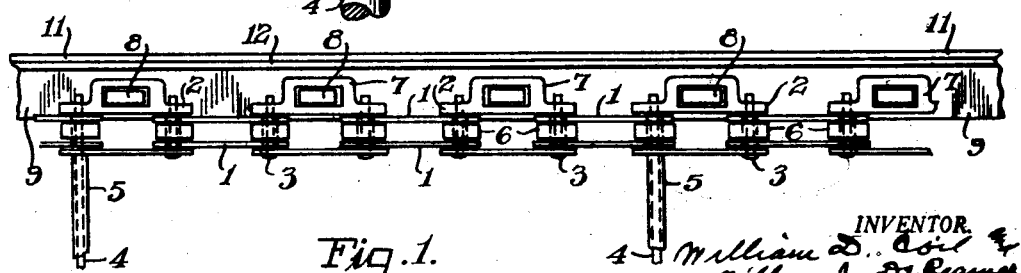
Fig. 1 is a plan view of a portion of one of the chains of an endless conveyer embodying the improvements, showing also a portion of the supporting track for the same.

Each of the links 2 and the side wall of its bracket are perforated to receive a spindle 13 upon which an inner bushing 14 of the roll 8 is journaled. The outer end of the opening 15 in the side wall of the bracket is countersunk on a taper to receive the tapered head 16 of the spindle, the degree of taper being such that the extreme outer end of the head 16 lies flush with the outer surface of the side wall of the bracket as shown in Figs. 2 and 3. The wall of the opening 15 is also provided with a recess 17 to form a seat for a key 18 which is formed integrally on the spindle to prevent the spindle from turning. The outer end of the spindle is provided with a transverse opening to receive a cotter pin 20 and the inner side of the link 2 is formed with bosses or extensions 21 to embrace the extreme inner end of the spindle, these bosses or extensions being vertically separated so as to provide a passage 22 therebetween to receive the cotter pin so as to not only protect the cotter pin against wear and dislodgement, but also form an additional means for preventing the spindle 13 from turning. The inner side of the link in line with this passage way 22 is also recessed as indicated at 23 to further accommodate the cotter pin.

By this arrangement it will be seen that a simple and effective construction is provided for protecting the rolls 8 and their bearing spindles 13 against wear by contact with the supporting tracks or other parts encountered in the travel of the conveyer. By having the spindles provided with the flat heads 16 which are entirely received in the countersunk tapered portions of the openings through brackets 7, the outer surfaces of the brackets will take all of the wear which occurs by reason of the friction with the strips 12 of the vertical portion of the track. By preventing the spindle 13 from turning, and placing the cotter pin at the inner end of the spindle and enclosing it by the extensions or bosses on the inner surface of the link, it will be seen that all danger of wear upon the cotter pin, or dislodgement of the cotter pin, is eliminated. Further, repairs can be readily made at any time by removing any one of the links 2 without disturbing any of the rolls of the structure.

Having thus described our invention, we claim:

1. In an endless conveyer, a conveyer chain formed of a plurality of pairs of links, each of a plurality of the outside links being formed with an integral U-shaped laterally-offset bracket on its outer side to provide with said link a housing open at the top and bottom and having a wall on its outer side, a spindle carried by the side walls of said housing, a roller journaled on said spindle a cotter pin for the inner end of said spindle, parts on the inner surface of said link for enclosing said cotter pin, and a head on the outer end of said spindle countersunk in the outer wall of the housing, and means in addition to the cotter pin to prevent said spindle from turning.

2. In an endless conveyer, a chain constituting a side chain of an endless conveyer, said chain being formed of a plurality of pairs of independent links, the ends of each alternate pair of links overlapping the ends of adjacent pairs of links, pivots for connecting said links together, an anti-friction roller mounted on each of the pivots between the links, an integral laterally offset housing formed on a plurality of the outside links only, each housing being formed open at the top and bottom and having a wall on its outer side with the link forming the inner wall and being disposed centrally of the length of the link, a spindle carried by the link and the outer wall of the housing, and a roller mounted on said spindle in said housing adapted to run on a track.

In testimony whereof, we have hereunto set our hands this 2nd day of Sept., 1926.

WILLIAM D. COIL.
WILLIAM J. DE REAMER.